(Model.)

J. J. DEPUTY.
VELOCIPEDE.

No. 286,593. Patented Oct. 16, 1883.

Attest.
N. N. Clark.
P. B. Turpin.

Inventor
Jesse J. Deputy
By R. S. & A. P. Lacey
Att'ys (Model.)
J. J. DEPUTY.
VELOCIPEDE.
No. 286,593. Patented Oct. 16, 1883.
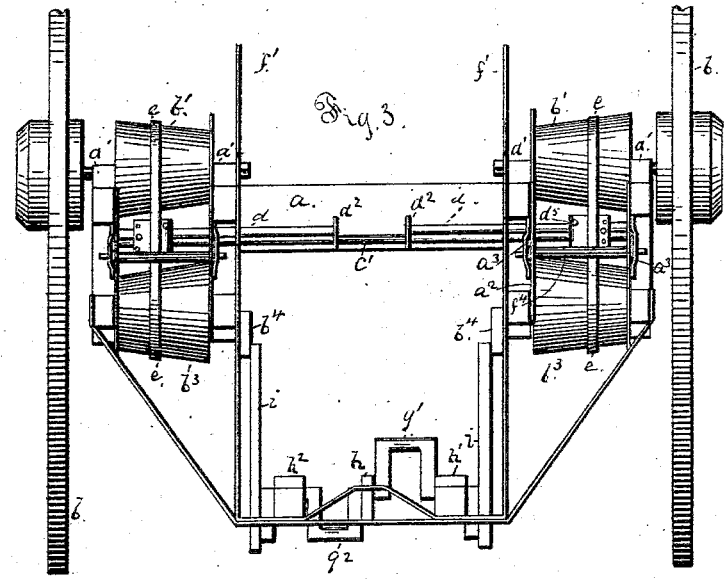
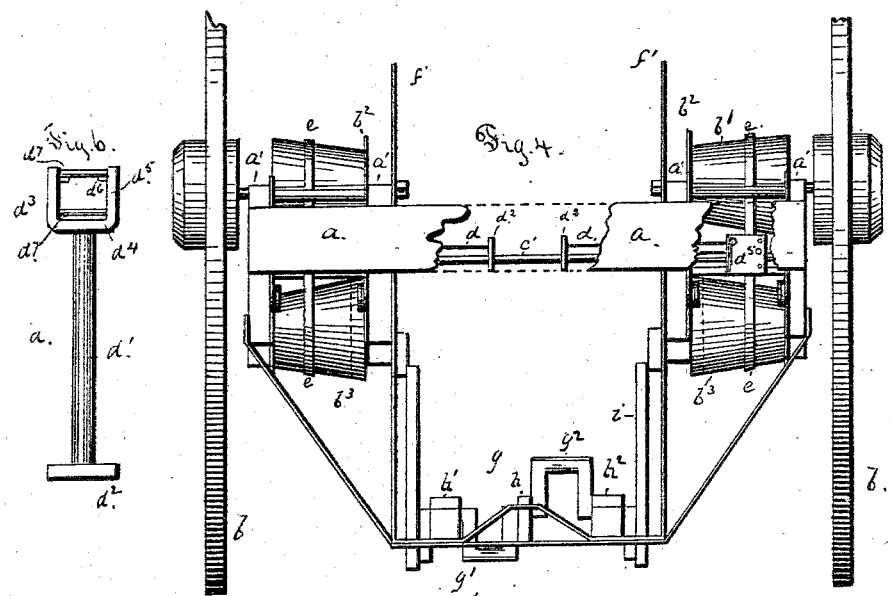
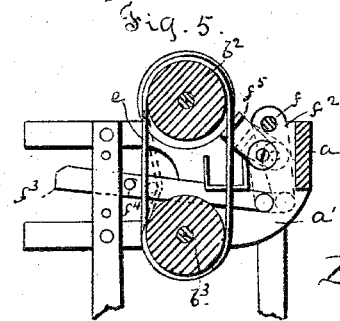
Attest.
N. A. Clark
P. B. Turpin
Inventor
Jesse J. Deputy
By R. S. & A. P. Lacey
Attys

UNITED STATES PATENT OFFICE.

JESSE J. DEPUTY, OF PHILADELPHIA, PENNSYLVANIA.

VELOCIPEDE.

SPECIFICATION forming part of Letters Patent No. 286,593, dated October 16, 1883.

Application filed January 12, 1883. (Model.)

*To all whom it may concern:*

Be it known that I, JESSE J. DEPUTY, a citizen of the United States, residing at Philadelphia, in the county of Philadelphia and State of Pennsylvania, have invented certain new and useful Improvements in Velocipedes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in velocipedes; and it consists in the construction, combination, and arrangement of the severals parts, as will be hereinafter fully described, and specifically pointed out in the claims.

Figure 1:
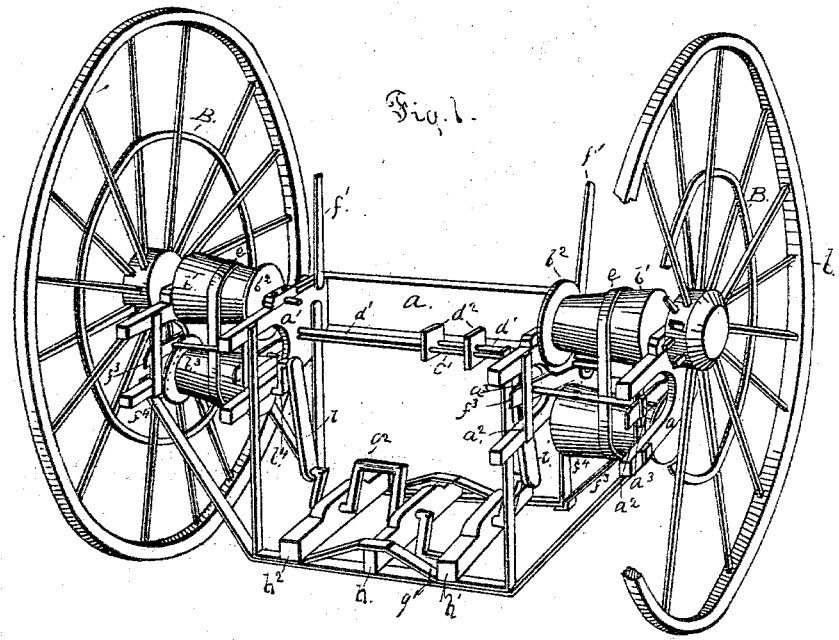
Figure 2:
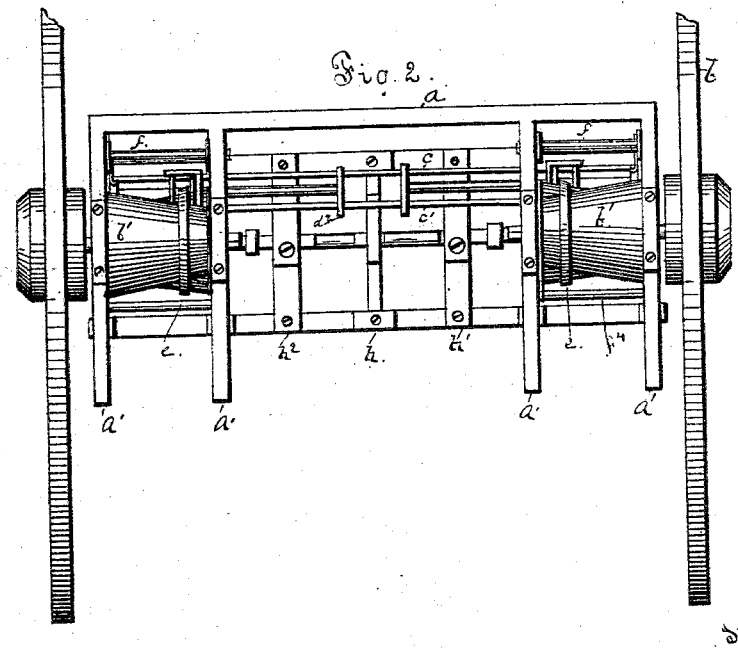

In the drawings, Figure 1 is a perspective view, Fig. 2 is a plan view, Fig. 3 is a rear elevation, and Fig. 4 is a front view, of a machine constructed according to my invention. Fig. 5 is a detached sectional view, and Fig. 6 is a detail view, of one of the belt-shifters, as will be hereinafter described.

$a$ is the front board, connecting the side frames, both of which frames are constructed alike, as shown, and the description of one will answer for both. These frames are composed of the side boards, $a'$ $a'$, having their forward ends made fast to board $a$, as shown.

$a^2$ are vertical bars secured to the inner faces of the boards $a'$, near the rear end of the latter, and provided with loops $a^3$, for the belt-tightener bars, hereinafter described.

$b$ $b$ are the wheels, having their axles extended across the side framing, and journaled in the boards $a'$ $a'$ in suitable bearings formed at or near the upper ends thereof. In making a wheel for velocipedes it is desirable to provide one of considerable diameter, and yet light, and in order to secure a large and light wheel I have found it convenient to brace and strengthen the same between the hub and the tire by means of a brace passed between the spokes, and touching and fastened to the sides thereof, facing each other, as shown, so as to strengthen the wheel and not add materially to its weight. This brace-band may be of wood, metal, wire, or other suitable material.

$b'$ are cone-pulleys secured on the axle of the wheels between the side boards, $a'$ $a'$. These pulleys are made plain-faced, and are provided on their smallest end with flange $b^2$, to prevent the belt, hereinafter described, from slipping off in the operation of the invention.

$b^3$ is a plain-faced cone-pulley journaled in suitable bearing or boxes in the side boards, $a'$ $a'$, below the pulley $b'$, and turned in opposite direction therefrom, as shown, so that the larger end of pulley $b^3$ is directly under the smaller end of the pulley $b'$, and its smaller end is under the larger end of pulley $b'$, as shown. The gudgeon of this pulley $b^3$ is provided with a crank, $b^4$.

$c$ $c'$ are guide-rods for the shifters. They extend between the outer side boards of the side frames, passing through the inner boards thereof, and are arranged slightly in rear of board $a$, as shown.

$d$ is the shifter, composed of rod $d'$, handle $d^2$, and bracket $d^3$, arranged on opposite end of the rod from the handle $d^2$. The handle-plate is provided with two holes, through which the rods $c$ $c'$ are passed. The bracket $d^3$ is composed of base-plate $d^4$, secured on end of rod $d'$, and side plate, $d^5$ $d^5$, extended forward from the base-plate $d^4$. The plate $d^2$ is provided with holes, through which the rods $c$ $c'$ pass, and the plates $d^5$ have eyes $d^6$, projected inward, as shown, and surrounding the rods $c$ $c'$, so that the whole shifter is mounted on and may be moved readily on the rods $c$ $c'$. $d^7$ $d^7$ are rollers journaled in the side plates, $d^5$ $d^5$, and arranged a sufficient distance apart to permit the belt to pass between them. The bracket $d^3$ is arranged between the boards $a'$ $a'$, and the rod $d'$ passes through the inner board, and the handle-plate $d^2$ rests on the rods $c$ $c'$ between the side frames, as shown.

$e$ is the belt, passed around pulleys $b'$ $b^3$ and through between the rollers $d^7$ $d^7$ of the shifter, as shown.

$f$ is a rod journaled in the boards $a'$ $a'$ in front of the roller $b'$, and provided with the lever or handle $f'$, projected upward therefrom in reach of the operator.

$f^2$ $f^2$ are bars depending from the rod $f$, and arranged close to the inner sides of the boards $a'$.

$f^2$ $f^3$ are bars having their forward ends pivoted to the lower ends of the depending bars $f^2$, and their opposite ends extended to the rear and passed through the loops $a^3$ on bars $a^2$.

$f^4$ is a roller journaled in and extended between the bars $f^3$ in rear of the belt $e$, as clearly shown in Fig. 5.

$f^5$ is a brake having one end secured to the bar $f^2$, arranged next the outer side board, $a'$, and its other end arranged to bear against the roller $b^2$ in the operation of the device, as will be described.

$g$ is the double crank, having the wrists $g'$ $g^2$, and journaled in the beams $h$ $h'$ $h^2$, supported on a suitable framing hung from the side frames, as shown.

$i$ $i$ are pitmen connecting the ends of crank $g$ with crank $b^4$.

The machine shown is intended for operation by two persons. It will be understood, however, that by providing a saddle or seat suitably arranged it could be operated by one person. The rider on the left stands with his left foot on the beam $h^2$ and his right foot on crank $g^2$, and the other rider stands with his left foot on the beam $h$ and his right foot on the crank $g'$, so that both riders work the crank with their right foot, and alternately, as will be seen. When tired in this position, they may change by the right operator putting his right foot on beam $h$, and both working the cranks with their left foot, as will be understood on reference to the drawings.

It will be seen that by shifting the belts from side to side, so as to bring it on the larger or smaller portions of the pulleys $b'$, the machine will be made to move faster or slower on the side on which so shifted. By moving them thus on one side, good results will be accomplished; but by moving both sides so as to bring the belt on the largest portion of one pulley $b'$ and on the smallest portion of the other pulley, a prompter motion may be had, and the machine readily guided. This is readily accomplished by means of the shifters $d$, which may be moved from side to side separately or together, as may be desired. These belts may be shifted by hand; or other shifting devices may be employed, as may be desired, though I prefer the device shown, as a convenient arrangement and efficient mechanism are thereby had. The lower plain-faced cone-pulley provides a simple means of keeping the belt properly taut as it is shifted from the larger to the smaller portion of pulley $b'$, and also gives a better action on the upper cone-pulley. It will be understood, however, that a pulley of equal diameter throughout its length might be used at the bottom, and any means desired be used to keep the belts tight when they are shifted from side to side on the upper plain-faced cone-pulley—such as, for instance, a bar hinged at one end, and having a roller at its other end arranged to bear against the belt, and a spring forcing the said roller against the belt. I prefer, however, the construction shown and before described.

Instead of the crank $g$ and pitman $i$, motion might be given direct to pulleys $b^3$ by grasping the cranks $b^4$, or otherwise, as desired.

It will be seen that by arranging the pulleys $b^2$ in opposite directions the machine may be made to go fast or slow by pulling the shifters $d$ toward each other or pushing them apart.

The belt-tightener, consisting of the bars $f^3$ and roller $f^4$, is operated by the bar $f^2$, depending from the rod $f$, provided with levers $f'$, arranged in reach of the operator, and the brake $f$ is secured to and operated by the same bar, $f^2$, so it will be seen that as the brake is applied the belt is loosened, and vice versa, each aiding the other in the operation of the machine.

In order to provide a better platform for the riders, it might be well in some cases to make the wrists $g'$ $g^2$ narrower and make the beams $h$ $h'$ $h^2$ wider than I have shown.

In practice, when the belts are pushed to the smaller ends of the upper pulleys, they will not generally run straight up and down, but will pass around the lower pulleys at a point about as indicated in dotted lines, Fig. 4, and it will be understood that where so desired the lower cone-pulley could be cut off, at about the point indicated in dotted lines, near their larger ends, or could be set a little farther out, so as to permit the pitmen to be arranged in under the smaller end of the upper pulleys, and thus give more room for the crank-shaft. It will also be understood that two crank-shafts could be arranged, so that the machine could be worked by four persons, as might be desired.

As before described, I prefer to arrange the upper pulleys in opposite directions, with their smaller ends adjacent to each other; but where so desired they might be arranged in the same direction, with both having their larger ends at the right or the left, as might be desired, in which case, of course, a corresponding alteration of the arrangement of the lower pulleys might be desired.

Having thus described my invention, what I claim, and desire to secure by Letters Patent, is—

1. The combination, in a velocipede, of the drive-wheel, the upper plain-faced cone-pulley secured on the axle thereof, the cone-pulley arranged below and in opposite directions from the upper pulley, a belt, a crank-shaft journaled in suitable bearings, and a pitman connecting the crank-shaft and the lower cone-pulley, substantially as and for the purposes specified.

2. In a velocipede, the combination of the drive-wheels keyed on independent axles, on opposite sides of the machine, with their axles in line with each other, the cone-pulleys secured on said axles and arranged with their smaller ends adjacent, the lower cone-pulleys, the belt, driving mechanism, and the shifters having their handle-plates $d^2$ arranged near together, whereby the guidance and regulation of speed of the machine may be more conveniently and accurately accomplished, substantially as and for the purposes specified.

3. In a velocipede, the combination of the swinging framing, the drive-wheels having their axles journaled in and supporting the framing, the cone-pulley $b'$, keyed on said axles, the cone-pulleys $b^3$, journaled in the framing vertically below the pulleys $b'$, the belts $e$, and means whereby the pulleys $b^3$ may be revolved, substantially as and for the purposes set forth.

4. The combination, in a velocipede, of the side frames composed of bars $a'$ $a'$, and arranged on opposite sides of the machine, the bar $a$, connecting the said side frames, the drive-wheels having their axles journaled in the side frames, the pulleys $b'$, secured on the axles between the bars $a'$, the cone-pulleys $b^3$, journaled between the bars $a'$, vertically under the pulleys $b'$, the belts $e$, the crank-shaft $g$, journaled in suitable bearings supported by the side frames, and the pitman $i$, connecting the shaft $g$ and pulley $b^3$, all arranged and operating substantially as and for the purposes set forth.

5. In a velocipede, the combination, with the pulleys $b'$ $b^3$, the drive-belt, and the shifter, of the rod $f$, lever $f'$, depending bar $f^2$, belt-tighteners $f^3$ $f^4$, and brake $f^5$, arranged and operating substantially as and for the purposes set forth.

6. The combination of the plain-faced cone-pulleys $b'$ $b^3$, the belt, and the shifter sliding on suitable ways, and having rollers $d'$ $d'$, journaled in its head-bracket, and arranged on opposite sides of the drive-belt, substantially as set forth.

7. In a velocipede, the combination, with the motor or drive pulleys and the belt passed around the same, of the belt-tightener arranged to engage the belt, the brake mechanism, and means connecting the brake and belt-tightener, whereby the application of the brake relieves the tension of the belt, and vice versa, substantially as and for the purposes specified.

8. In combination with the pulleys $b'$ $b^3$ and the drive-belt, the rod $f$, bar $f^2$, brake $f^5$ and bars $f^3$, and roller $f^4$, and means whereby the pulley $b^3$ may be revolved, arranged and operating substantially as set forth.

9. In combination with the pulleys $b'$ $b^3$, the belt, the rods $e$ $e'$, the shifter sliding thereon and connected with the belt, and means whereby motion may be applied to pulley $b^3$, as set forth.

10. The combination, with pulleys $b'$ $b^3$, and the belt, and crank $b^4$, of the beams $h$ $h'$ $h^2$, suitably supported, and providing platforms for the riders and bearings for the crank $g$, and the crank $g$, having wrists $g'$ $g^2$, and the pitmen $i$, connecting the cranks $g$ and $b^4$, substantially as set forth.

11. In a velocipede, substantially as described and shown, the drive or motor pulleys, made in truncated-cone form, and provided at their smaller end with a flange or guard plate, $b^2$, as and for the purposes specified.

12. In a velocipede, the combination of the pulley $b'$ $b^3$, belt $e$, the brake $f^5$ and belt-tightener $f^3$ $f^4$, and the shifter $d$, substantially as set forth.

In testimony whereof I affix my signature in presence of two witnesses.

JESSE J. DEPUTY.

Witnesses:
 B. A. MITCHELL,
 EDW. HAUGH.